United States Patent [19]
Tucker

[11] 3,726,491
[45] Apr. 10, 1973

[54] ANTI-BACKUP MECHANISM FOR A FILM CARTRIDGE TAKE-UP SPOOL

[75] Inventor: Archie J. Tucker, Rochester, N.Y.

[73] Assignee: Eastman Kodak Company, Rochester, N.Y.

[22] Filed: Nov. 30, 1971

[21] Appl. No.: 203,209

[52] U.S. Cl. .................... 242/194, 242/71.2, 352/72
[51] Int. Cl. ......................... G03b 1/04, G11b 15/32
[58] Field of Search .......................... 242/71.2, 194; 352/72–78

[56] References Cited

UNITED STATES PATENTS

| | | | |
|---|---|---|---|
| 3,208,686 | 9/1965 | Edwards et al. | 242/194 |
| 3,622,101 | 11/1971 | Sutliff et al. | 242/194 |
| 3,539,130 | 11/1970 | Winkler et al. | 242/194 |
| 3,623,679 | 11/1971 | Neudecker et al. | 242/194 |

Primary Examiner—Leonard D. Christian
Attorney—William H. J. Kline et al.

[57] ABSTRACT

A film cartridge includes an anti-backup mechanism having a ratchet assembly for securing automatically a film take-up spool against reverse rotation when the cartridge is out of a camera and for permitting reverse rotation of the take-up spool such as to withdraw exposed film from the cartridge for processing or to photograph "fade, lap and dissolve" sequences when the cartridge is loaded in a camera. The ratchet assembly comprises an elongate finger member, formed internal with a cartridge partition (for example), engageable with an inclined ratchet surface molded onto the spool. The spool is mounted for axial movement between a first position in which the finger member and the inclined surface cooperate to secure the spool against rotation in the reverse direction and a second position in which the finger member and the inclined surface are disengaged to permit reverse rotation of the spool. In both positions the spool is rotatable in the forward or take-up direction. In one preferred embodiment, the anti-backup mechanism includes a helical spring for biasing the spool into its first position and for permitting movement to its second position when an external axial force is applied to the spool, such as when the cartridge is loaded into a camera and is operably coupled to a camera drive mechanism. In another embodiment the spring force is provided by spring finger members integral with a cartridge wall.

6 Claims, 7 Drawing Figures

PATENTED APR 10 1973 3,726,491
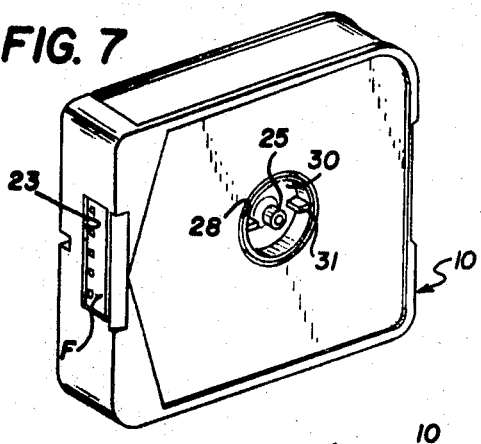
FIG. 7
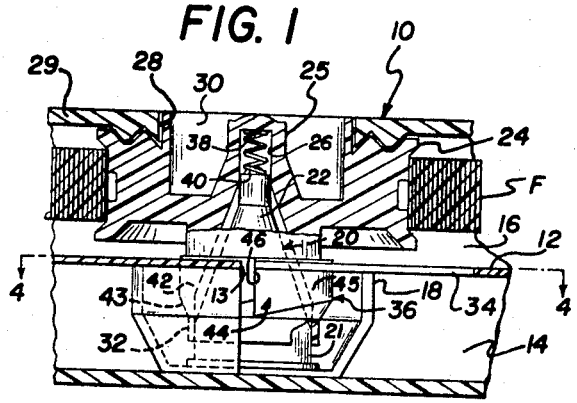
FIG. 1
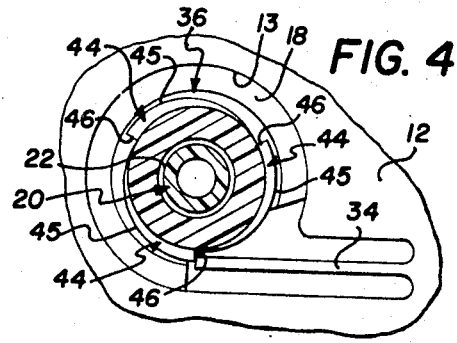
FIG. 4
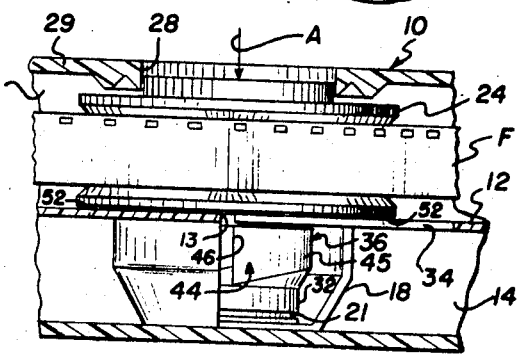
FIG. 6
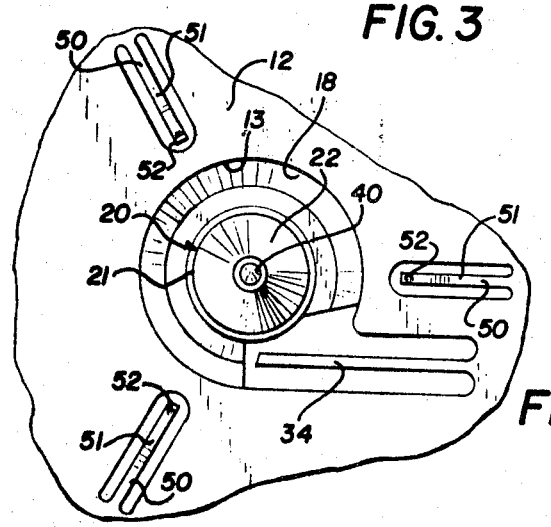
FIG. 2
FIG. 3
FIG. 5
ARCHIE J. TUCKER
INVENTOR.
BY D. Herman Childers
W. H. J. Kline
ATTORNEYS

ANTI-BACKUP MECHANISM FOR A FILM CARTRIDGE TAKE-UP SPOOL

CROSS-REFERENCE TO RELATED APPLICATIONS

Reference is made to commonly assigned, copending U.S. Patent Application Ser. No. 141,324, entitled "A Disengageable Anti-Backup Mechanism For A Film Cartridge", filed May 7, 1971 in the name of J. L. Almstead.

BACKGROUND OF THE INVENTION

1. Field of the Invention

This invention relates generally to film cartridges. More specifically, this invention is directed to film cartridges having an actuable anti-backup mechanism for the take-up spool for controlling reverse rotation thereof wherein the take-up spool is secured against rotation in the reverse direction when the cartridge is out of a camera, and when the cartridge is loaded into the camera the anti-backup mechanism can be disabled so that reverse rotation of the take-up spool can occur.

2. Description of the Prior Art

Film cartridges for use in motion picture cameras are generally described in commonly assigned U.S. Pat. No. 3,208,685 entitled "Anti-Friction Disk for Strip Material", issued Sept. 28, 1965 in the names of E. A. Edwards and A. J. Tucker, and commonly assigned U.S. Pat. No. 3,208,686 entitled "Film Cartridge" issued Sept. 28, 1965 in the names of Edwards, Munson and Black. In such cartridges (commonly referred to as super 8 cartridges) a supply roll of film is disposed about either a fixed or movable projection and the film is withdrawn from the projection along a film threading path past an exposure aperture and then wound onto a film take-up spool. If cartridges of this general type are subjected to rough handling (as may occur during shipping) there is a tendency for successive outer convolutions of the film roll to be radially displaced relative to the central axis thereof. Such a displacement, known in the art by the term "clock-spring", can be guarded against by various cartridge devices which prevent reverse film movement. These devices are known as anti-backup mechanisms.

However, it is often desirable to include capability for moving film in a reverse direction. Reverse film movement is necessary for photographing "fade, lap and dissolve" sequences as described in commonly assigned U.S. Patent application Ser. No. 141,324, entitled "A Disengageable Anti-Backup Mechanism for a Film Cartridge", filed May 7, 1971 in the name of J. L. Almstead. It is also desirable, for processing the film, to be able to simply withdraw exposed film in the reverse direction from the cartridge without destroying the cartridge.

In order to provide reverse film movement capability for a cartridge having an anti-backup mechanism, means must be included for disabling such a mechanism. Cartridges of this type are described in commonly assigned U.S. Pat. No. 3,584,806 entitled "An Anti-Backup Mechanism for the Take-up Spool in a Film Cartridge", issued June 15, 1971 in the names of E. A. Edwards and R. C. Sutliff and in U.S. application Ser. No. 141,324 referred to hereinbefore. The anti-backup mechanism in two such cartridges is comprised of a conventional shuttle mounted in the cartridge for movement transverse to the axis of rotation of the spool and slide member mounted on the spool engageable with the shuttle for positioning it in one position for preventing reverse rotation of the spool and in a second position for disabling the mechanism. These arrangements require extensive modifications to conventional movie film cartridges and, in addition, it has been found that in severe handling of the cartridge the shuttle contained therein may fail. Another disadvantage of these arrangements is that the shuttle is oscillated when the take-up spool is rotated, which creates a noise signal. Such a signal, if of sufficient intensity, can be picked up by a microphone used for recording on sound film thereby creating obvious deleterious results.

Another anti-backup mechanism described in the copending application Ser. No. 141,324 comprises a rigid elongate member (such as a wire) having a detent at one end engageable with the spool for controlling rotation thereof. The member is secured at the opposite end to a movable pressure pad for sliding the detent into and out of engagement with the spool.

SUMMARY OF THE INVENTION

One of the objects of the present invention is to provide a film cartridge having an improved anti-backup mechanism.

A further object of this invention is to provide a film cartridge having an anti-backup mechanism which can be disabled automatically when such a cartridge is loaded into a movie camera.

A still further object of this invention is to provide a film cartridge having an improved, disengageable anti-backup mechanism formed from conventional film cartridge components.

Another object of this invention is to provide a film cartridge having an anti-backup mechanism which is silent, thereby making it suitable for use in a sound movie camera.

Another object of the invention is to provide a film cartridge having an anti-backup mechanism of the type described above which can be used in a conventional movie camera without requiring modification to such a camera.

Another object of the invention is to provide an anti-backup mechanism of the type described herein which can be disabled when desired by slidably moving a film take-up spool in an axial direction.

Another object of the invention is to provide a film cartridge of the type described herein in which the film in such a cartridge can be removed for processing simply and efficiently.

A still further object of the invention is to provide a cartridge having an improved anti-backup mechanism that is of simple design and construction and economical to manufacture.

In accordance with the present invention, a film cartridge includes an internal wall for defining a film take-up chamber adapted to receive a take-up spool disposed therein for rotation in either direction and for slidable movement in an axial direction between a first and a second position. The cartridge is provided with an anti-backup mechanism comprising a ratchet assembly adapted for securing the take-up spool against rotation in a reverse direction when the spool is in the first position and for permitting reverse rotation when the spool is in the second position. The ratchet assembly includes an elongate resilient finger member formed integral with the internal wall and a ratchet cut from a portion of the spool wherein the finger member and the ratchet are cooperatively engaged when the spool is in the first position and are disengaged when the spool is in the second position. A resilient member normally maintains the spool in the first position when the cartridge is outside a camera so that the anti-backup mechanism is engaged automatically. When the cartridge is loaded into the camera the resilient member permits axial movement of the spool to the second position wherein the mechanism is wall The invention, and its objects and advantages, will become more apparent in the detailed description of the preferred embodiments presented below.

BRIEF DESCRIPTION OF THE DRAWING

In the detailed description of the preferred embodiments of the invention presented below, reference is made to the accompanying drawings, in which:

FIG. 1 is an enlarged cross-sectional view of a portion of a film cartridge according to the invention showing a hub for receiving the supply roll of film and a film take-up spool, and illustrating a preferred embodiment of the anti-backup mechanism according to the present invention in an engaged position;

FIG. 2 is a cross-sectional view of a portion of the cartridge, similar to FIG. 1, but with the take-up spool in an actuated position such that the anti-backup mechanism illustrated therein is disabled;

FIG. 3 is a view of a portion of the cartridge, similar to FIG. 1, but showing an alternate embodiment of the anti-backup mechanism;

FIG. 4 is a cross-sectional view of the cartridge shown in FIG. 1 taken along the line 4—4 in FIG. 1 showing a plan view of the anti-backup mechanism according to one preferred embodiment of the invention;

FIG. 5 is a view of the take-up chamber of the cartridge shown in FIG. 3 with the take-up spool removed, and showing a plan view of another preferred embodiment of the invention;

FIG. 6 is a view, partially in section and partially in elevation, of the cartridge shown in FIGS. 3 and 5 showing film wound on the take-up spool and the anti-backup mechanism illustrated therein in the disabled position; and FIG. 7 is a perspective view of a cartridge incorporating an anti-backup mechanism of the invention.

DESCRIPTION OF THE ILLUSTRATED EMBODIMENTS

Because film cartridges are well known, the present description will be directed in particular to elements forming part of, or cooperating more directly with, apparatus in accordance with the present invention. It is to be understood that elements not specifically shown or described may take various forms well known to those skilled in the art.

Referring to the drawings and in particular to FIGS. 1, 2, 4 and 7, this invention is shown in connection with a film cartridge 10 for a motion picture camera. Cartridge 10 is of a type disclosed in the before-mentioned U.S. Pat. Nos. 3,208,685 and 3,208,686, the disclosures of which are incorporated herein by reference.

Cartridge 10 has a wall or partition 12 which has an aperture 13 therein. The partition extends longitudinally through the cartridge for defining along with the exterior walls of the cartridge, and other walls (not shown in their entirety) a film supply chamber 14 and a film take-up chamber 16 in substantially coaxial alignment with each other on opposite sides of the partition. Mounted substantially within the center of supply chamber 14 opposite aperture 13 is a hollow boss of hub 18 for receiving a supply roll of film F (not shown). Rigidly secured within the center of boss 18 is a post or stud 20, extending upwardly through aperture 13 into take-up chamber 16. Post 20 is defined in the lowermost region by a circular base or pedestal portion 21 and in the uppermost region by a truncated substantially conically-shaped portion 22. Journaled on the upper end of post 20 for rotation in either direction and for slidable movement in the axial direction is a film take-up spool 24.

Cartridge 10 includes a film exposure aperture 23 and film guide means (also not shown). Film F is withdrawn from a roll positioned around hub 18 and advanced into communication with the exposure aperture wherein the film is exposed for a predetermined time to light from a scene. After film F is exposed, the film is guided onto take-up spool 24.

Spool 24 has at its center and on the uppermost side thereof a hollow hub or projection 25 positioned opposite the end of truncated portion 22 of the post to define a cavity 26 therebetween. Hub 25 is centered within an aperture 28 in a sidewall 29 of cartridge 10 and defines an annular region or socket 30. Lugs 31 (FIG. 7) in the recess are adapted to be engaged by a conventional rotatable drive member (not shown) mounted within a camera for drivingly engaging spool 24 for winding or unwinding film F. Spool 24 defines on the lowermost side thereof an integral, hollow member 32 which extends downwardly through aperture 13 with its lowermost portion being cylindrical and fitting snugly around pedestal member 21. This fit with member 21 serves to maintain spool 24 in a substantially upright position when the spool is moved in the axial direction for engaging and disabling an anti-backup mechanism in accordance with the present invention.

In accordance with the present invention, the anti-backup mechanism of cartridge 10 comprises, in the embodiments illustrated in the attached drawing, a ratchet assembly adapted for securing take-up spool 24 against rotation in a reverse or counterclockwise direction (as viewed from the take-up side of cartridge 10), when the cartridge is outside a camera and for permitting rotation of the spool in a reverse direction when a force is applied to spool 24 in the axial direction, as described in more detail hereinafter. In the embodiments illustrated herein, the ratchet assembly includes a detent comprising an elongate resilient pawl finger 34 formed integral with and disposed in the plane of partition 12 and a ratchet 36 on the take-up spool 24. This formation of the finger is described in more detail in U.S. Pat. No. 3,622,101, issued to Sutliff et al. on Nov. 23, 1971 for an Integral Anti-Backup Mechanism in a Motion Picture Film Cartridge. Ratchet 36 is adapted to cooperate with finger member 34 to secure spool 24 against rotation in a reverse direction when the spool is in a first axial position (FIGS. 1 and 3). As seen in the attached drawings and described more completely hereinbelow, finger member 34 is disposed such that when the anti-backup mechanism is in the engaged position (FIGS. 1 and 3.) the finger member engages ratchet 36, and when the anti-backup mechanism is in its disabled position (FIG. 2) the finger member is disengaged therefrom.

In the embodiment illustrated in FIGS. 1, 2, and 4, the anti-backup mechanism includes a helical spring 38 disposed within cavity 26 to bias the backup mechanism toward its first (engaged) position, shown in FIG. 1, when cartridge 10 is out of a camera, and to permit axial movement of the mechanism to its second position, as shown in FIG. 2, when an axial force "A" greater than the biasing force of the spring is applied to the spool in the downward direction. Force F can be applied manually or automatically when the cartridge is operably coupled to a camera drive mechanism or when it is in a film processing apparatus, for example. Secured to the top portion of post 20 is a small protrusion or knob 40 that serves to center spring 38 at the top of the post and to maintain the spring in an upright position.

As illustrated in FIG. 1, downwardly extending member 32 includes a section 42 having an enlarged outer diameter 43 defining ratchet 36. In a preferred embodiment, ratchet 36 comprises a plurality of teeth 44 (FIG. 4) adapted for cooperatively engaging finger member 34 when spool 24 is in its first position. Teeth 44 are defined in the counterclockwise direction by gradually inclined surfaces 45 and sharply inclined surfaces 46, as seen in FIG. 4. When spool 24 is in the first position and is rotated in the clockwise direction, the distance between the end of finger member 34 and surface 45 changes from a maximum value at one end of a tooth 44 to a zero value substantially midway along such a surface. Then finger member 34 flexes and follows the slope of surface 45 until the opposite end of such a tooth is reached wherein the finger member returns to its original position. Resilient finger member 34 flexes radially outward to the axis of spool 24 as the member follows the slope of tooth 44 and as such produces a minimum of resistance to the clockwise rotation of the spool. However, when spool 24 is rotated in the counterclockwise direction, sharply inclined surface 46 of a tooth impacts the end of finger member 34 and the spool is secured against further rotation in the counterclockwise direction.

When spool 24 is moved downwardly to the second position (FIG. 2) by force A, ratchet teeth 44 are no longer disposed in a plane common to partition 12 so that the spool is free to rotate in either a take-up or an unwinding direction. In this position the anti-backup mechanism is disabled since ratchet 36 and finger member 34 are disengaged, thereby permitting rotation of the take-up spool in either direction for filing fade, lap and dissolve sequences. Also, when a camera is operated with the ratchet assembly disengaged, the cartridge does not generate a noise signal in response to the rotation of take-up spool 24 as film F is wound thereon.

Another preferred embodiment of an anti-backup mechanism for a film cartridge is best illustrated in FIGS. 3, 5 and 6. In this embodiment, spring means in the form of one or more resilient members 50 is adapted for biasing spool 24 into its first (engaged) position and for permitting axial movement of the spool to its second (disengaged) position. The spring means shown comprises three resilient finger members 51, each of which have one end formed integral with partition 12 and the opposite end curved upwardly into chamber 16. The outermost or free end of each finger defines a detent 52 which bears against the lowermost side of spool 24. Members 51 are distributed circumferentially about the axis of spool 24 at approximately 120° intervals, and normally they maintain the spool in the first position when the cartridge is outside the camera. However, the fingers permit slidable movement of the spool in the axial direction to a second position for disabling the anti-backup mechanism when cartridge 10 is loaded into a camera, film processor, etc. The integral finger members 51 eliminate the need for the separate spring 38 used in the previously described embodiment. While not shown in FIG. 5, it is to be understood, of course, that ratchet 36 cooperates with finger 34 in the manner described in connection with FIGS. 1, 2 and 4.

When a force A is applied to spool 24 in the downward direction of a magnitude in excess of the bias force of the resilient bias member (38 or 50) of the embodiments described herein, the spool will slide downwardly along the outer periphery of post 20 to the second position wherein the anti-backup mechanism of the subject invention is in a disabled position and spool 24 can be rotated freely in either direction. When such a downward force is applied, spool 24 will slide axially downwardly guided by pedestal member 21 until ratchet 36 is no longer positioned in the plane of partition 12 for engagement with finger member 34. When the downward force on spool 24 is released, the spool will automatically return to the first position wherein ratchet 36 is again positioned for engagement with member 34. Spool 24 is returned to the first position by the bias force of the resilient bias member, which is directed against the spool in the upward direction.

When cartridge 10 is properly loaded into a motion picture camera (not shown) the anti-backup mechanism of the subject invention can be disabled either manually or automatically. Such a camera could be either the normal silent camera or a "sound" camera. Either type of camera can have a reversible drive mechanism for cooperatively engaging spool 24 to enable an operator to photograph "fade, lap and dissolve" sequences. Such reversible drive mechanisms are well known in the art and need not be further described herein.

When cartridge 10 is loaded into a movie camera, the camera drive mechanism normally is coupled through lugs 31 to take-up spool 24 by means of a suitable camera drive member as is well known in the art. If automatic disengagement of the anti-backup mechanism is desired, such a drive member could project or have a projection such as a drive lug, post or stud extending greater than the depth of cavity 30, so that coupling the clutch member to the spool automatically effects axial movement of the anti-backup mechanism to the second position as permitted by the resilient bias member. In the second position, shown in FIG. 2, the ratchet assembly comprises ratchet 36 and finger member 34 are completely disengaged, so that when the drive mechanism is energized spool 24 can rotate within cartridge 10 in either the forward or the reverse direction.

Utilizing a film cartridge such as cartridge 10 with the herein disclosed anti-backup mechanism with a sound-type movie camera offers particular advantages over selected anti-backup mechanism disclosed in the prior art references. In particular, when cartridge 10 is loaded into a camera, the ratchet assembly of the anti-backup mechanism can be completely disabled so that the mechanism is prevented from generating noise signals which might be recorded by the camera sound system.

When cartridge 10 is removed from a camera, the anti-backup mechanism is automatically returned to the engaged position by the spring means so that the clockspringing of the film is prevented. More specifically, the bias force exerted on spool 24 by the resilient bias member (spring 38 or resilient member 50) effects axial movement of the spool in the upward direction to the positions shown in FIGS. 1 and 3, respectively. In these engaged positions, ratchet 36 intersects the plane of partition 12 and cooperatively communicates with finger member 34 to secure spool 24 against reverse rotation of no more than a fraction of a single revolution, whereby film clockspringing is prevented.

The anti-backup mechanism of the subject invention offers a simplified method for removing film F from cartridge 10. As discussed previously herein, access to the exposed film in the cartridge often can only be achieved by physically destroying the cartridge. Normally, in order to process the film the cartridge has to be destroyed under darkroom conditions, or finger 34 has to be disabled by a punch (for example) as disclosed in the beforementioned U.S. Pat. No. 3,622,101 to Sutliff et al. In addition to the obvious disadvantage of destroying the cartridge, there is danger that the film may be damaged such as due to cartridge fragments scratching the film surface.

With the anti-backup mechanism of the subject invention, exposed film F can be removed directly from cartridge 10 through exposure aperture 23 by applying pressure to spool 24 in the downward direction. This pressure will cause spool 24 to slide to the second position wherein the anti-backup mechanism is disabled. When the backup mechanism is disabled, film F can be withdrawn through the exposure 23 directly from the take-up spool either manually or by suitable apparatus and fed into the film processor.

The invention has been described in detail with particular reference to two embodiments thereof, but it will be understood that variations and modifications can be effected within the spirit and scope of the invention.

I claim:

1. In a motion picture film cartridge having an exposure aperture and having means for guiding an elongate strip of film past the aperture to expose the film to radiation from a scene, the improvement comprising:
   a. a take-up spool rotatable in the cartridge about an axis in either a take-up direction or an unwinding direction, the spool being adapted to receive film thereon;
   b. a ratchet mechanism comprising (1) a ratchet coupled to said spool for rotation therewith and (2) a detent mounted in said cartridge and spaced transverse to the axis of said spool;
   c. means mounting the spool in the cartridge for movement in an axial direction between (1) a first position wherein said ratchet and said detent are aligned and engageable to secure said spool against rotation in an unwinding direction and (2) a second position wherein said ratchet is axially displaced from said detent to permit said spool to rotate in either direction; and
   d. means for biasing said spool toward its first position within said cartridge so that a force directed against said spool in a direction opposite to the biasing force can effect axial movement of said spool from its first position to its second position.

2. An improvement in a motion picture film cartridge as set forth in claim 1 wherein the cartridge includes a housing having a partition defining a supply chamber and take-up chamber, said detent of said ratchet mechanism comprising an elongate flexible member integral with said partition.

3. An improvement in a cartridge as set forth in claim 2 wherein said partition has an aperture therein, said spool has a portion projecting through said aperture, and said ratchet comprises at least one finger means rigidly secured to said portion of said spool for rotation therewith.

4. In a motion picture film cartridge having a housing with an exposure aperture and having means for guiding film past the aperture to expose the film to radiation, and a partition within the housing defining a film supply chamber and a film take-up chamber, the improvement comprising:
   a. a take-up spool having a portion positioned within the take-up chamber and accessible from the exterior of said cartridge housing, the spool being rotatable about an axis in either a take-up direction or an unwinding direction and being adapted to receive film thereon, said take-up spool having a second portion defining a ratchet member with an outer periphery adapted to generate a relatively low resistance to rotation in the take-up direction and to generate a relatively high resistance to rotation in the unwinding direction;
   b. said partition including a resilient elongate member having one end portion formed integrally with the partition and a second end portion adapted to cooperate with said outer periphery of said ratchet member for controlling rotation of said spool;
   c. means mounting said spool for axial movement between (1) a first position wherein said ratchet member is engageable with said elongate member to prevent rotation of said spool in the unwinding direction and (2) a second position wherein said ratchet member is axially displaced from said elongate member to permit rotation of said spool in either direction; and
   d. resilient means for biasing said spool toward its first position and for permitting movement of said spool to its second position when a force having a magnitude in excess of the bias force is applied in the axial direction against said spool from the exterior of said cartridge.

5. An improvement in a cartridge as set forth in claim 4 wherein said resilient means comprises a helical spring having a portion engaging said spool.

6. An improvement in a cartridge as set forth in claim 4 wherein said resilient means comprises a plurality of resilient finger members distributed about the axis of said spool each of said finger members having one end portion integral with said partition and having a detent portion resiliently bearing against said take-up spool.

* * * * *